United States Patent
Tsai

(10) Patent No.: US 6,373,983 B1
(45) Date of Patent: Apr. 16, 2002

(54) METHOD FOR DETECTING THE OCCURRENCE OF MISSING LINES ON IMAGES GENERATED BY AN OPTICAL SCANNER

(75) Inventor: Jenn-Tsair Tsai, Taipei (TW)

(73) Assignee: Mustek Systems, Inc. (TW)

( * ) Notice: Subject to any disclaimer, the term of this patent is extended or adjusted under 35 U.S.C. 154(b) by 0 days.

(21) Appl. No.: 09/138,539

(22) Filed: Aug. 24, 1998

(51) Int. Cl.⁷ .......................... G06K 9/36; G06K 9/46; G06K 9/68; H04N 1/04; H04N 1/40

(52) U.S. Cl. ...................... 382/192; 382/112; 382/169; 382/194; 382/218; 382/286; 358/455; 358/474

(58) Field of Search ...................... 382/112, 168–172, 382/181, 190, 193–194, 201, 206, 218, 286, 289, 312, 317, 319; 358/453, 454, 455, 461, 474, 504

(56) References Cited

U.S. PATENT DOCUMENTS

| | | | | |
|---|---|---|---|---|
| 4,020,281 A | * | 4/1977 | Davis, Jr. ................. | 178/18.09 |
| 4,575,124 A | * | 3/1986 | Morrison .................... | 283/115 |
| 4,774,569 A | * | 9/1988 | Morton et al. .............. | 348/107 |
| 5,721,793 A | * | 2/1998 | Ushida et al. .............. | 382/300 |

* cited by examiner

Primary Examiner—Andrew W. Johns
Assistant Examiner—Daniel G. Mariam
(74) Attorney, Agent, or Firm—Powell, Goldstein, Frazer & Murphy, LLP

(57) ABSTRACT

An automatic method detects missing lines occurred in an image, thereby identifying possible internal problems in the scanner. The method comprises the following steps. First, from the image of a slanting line, the pixel having gray levels closest to the median value of the predetermined highest gray levels and set a fault tolerance value are identified. Then the pixel as $(X_i,Y_j)$. Then, the gray levels of the pixels on $(X_i,Y_j)$ and $(X_{i-1},Y_{j+1})$ are compared. If the gray-level difference between these two pixels is larger than the fault tolerance value, the occurrence of a missing line is determined. To determine the total number of missing lines on that row, the gray levels to check if $(X_{i-2},Y_{j+1}) \leq (X_i,Y_j) < (X_{i-1},Y_{j+1})$ are compared. If not, the shift index k is incremented by one repeatedly until the gray-level difference is correspondent to the predetermined comparison condition. However, if the gray-level difference between the pixels on $(X_i,Y_j)$ and $(X_{i-1},Y_{j+1})$ is smaller than the fault tolerance value, then it is determined that no missing line occurs on that row. During the comparison process, the number of missing lines will be incremented. If the total number of missing lines exceeds an allowable range, the optical scanner is not qualified.

15 Claims, 3 Drawing Sheets

METHOD FOR DETECTING THE OCCURRENCE OF MISSING LINES ON IMAGES GENERATED BY AN OPTICAL SCANNER

BACKGROUND OF THE INVENTION

A. Field of the Invention

The present invention relates to an image-quality test for an optical scanner. More particularly, the present invention relates to a method for automatically detecting the occurrence of missing lines on an image generated by an optical scanner, thereby detecting the internal problems of the optical scanner.

B. Description of the Prior Art

The image quality of an optical scanner may be influenced by hardware and software problems. Various tests are designed to determine the source of the problems. One test is especially directed to the occurrence of missing lines. Missing lines occur under several circumstances. For instance, as the optical module is driven by an unstable step motor, which cannot drive the transmission system in a constant speed, the scanner may generate discontinuous images. Missing lines also occur when the control system has malfunctions. They also happen when the transmission system and the image sensor are driven at different speeds. Consequently, from the occurrence of the missing lines, possible internal problems of the optical scanner may be predicted. For example, if the number of missing lines for each image scanned is the same, the problem may be very likely caused by the controlling software. On the other hand, if the missing lines always occur at the same places for each image scanned, the problem may be either caused by the motor or the transmission system.

Conventional method for detecting the occurrence of missing lines depends on eye inspection. First, a calibration paper having patterns of slanting line segments thereon for the scanner to read is used. Then, from the image generated, the number of missing lines and identify the locations where the missing lines occurred are counted. The inspectors have to scale up the image to a proper proportion and then determine the location of the missing lines from the pattern of the staircase along two sides of the slanting line segments. For instance, if a single line is missed, the pattern of the staircase will lose one stair. If there are two missing lines, the pattern of the staircase will lose two stairs and so on. If the total number of missing lines is within an allowable range, the image quality of the scanner is qualified. If not, the scanner is not qualified and must be repaired.

The conventional eye inspection method for detecting the occurrence of missing lines is labor demanding especially for images of high resolution. Moreover, to ensure that the image sensor of the optical scanner is well controlled, a document usually has to be repeatedly scanned. Furthermore, eye inspection is not reliable. It is slow in speed, high in error rates and is inconsistent in judgement from time to time. Consequently, the image quality of the optical scanner cannot be guaranteed.

SUMMARY OF THE INVENTION

Accordingly, the object of the present invention is to provide an efficient method for detecting the occurrence of missing lines on images generated by an optical scanner, thereby determining the image quality of the optical scanner.

It is another object of the present invention to provide a method that is applicable to all kinds of scanners for automatically detecting the image qualities, thereby replacing eye inspection and increasing the speed and accuracy of the quality test.

It is a further object of the present invention to provide an automatic method for predicting possible internal problems of an optical scanner from the occurrence of missing lines.

These and other objects of the invention, which will become apparent as the invention is described more fully below, are obtained by providing an improved method for automatically detecting the occurrence of missing lines. The method consists of the following steps: First, the slanting line segment on a calibration paper is read. Then, the median value of the predetermined highest gray levels and set a fault tolerance value are calculated. The first row of the slanting line segment is searched to find the pixel with gray levels closest to the median value. After finding the pixel, the pixel is denoted as $(X_i, Y_j)$ where i,j are equal to 1. The pixel on $(X_i, Y_j)$ is allowed to be the starting pixel for gray-level comparison.

Then, the gray levels of the pixels located on $(X_i, Y_j)$ and $(X_{i-1}, Y_{j+1})$ is compared. If the gray-level difference between these two pixels is larger than the fault tolerance value, the occurrence of a missing line is determined. The number of missing lines is then incremented by one. To determine the total number of missing lines on that row, the gray levels of the pixels located on $(X_i, Y_j)$, $(X_{i-1}, Y_{j+1})$, and $(X_{i-2}, Y_{j+1})$ such that $(X_i, Y_j) < (X_{i-1}, Y_{j+1})$ and $(X_i, Y_j) > (X_{i-2}, Y_{j+1})$ are checked. If they are not correspondent to the comparison condition, the shift index k will be incremented by one repeatedly until the gray-level difference is correspondent to a predetermined condition.

However, if the gray-level difference between the pixel on $(X_i, Y_j)$ and $(X_{i-1}, Y_{j+1})$ is smaller than the fault tolerance value, then this indicates that there is no occurrence of missing line on that row. The comparison can directly move on to the next row. During the comparison process, the number of missing lines will be incremented and the places where missing lines occurred will be marked. After the entire image has been checked, the total number of missing lines will be displayed with marks indicating the location of the missing lines. If the total number of missing lines is within an allowable range, the image quality of the optical scanner is qualified. Otherwise, the optical scanner is not qualified.

BRIEF DESCRIPTION OF THE DRAWINGS

These and other objects and advantages of the present invention will become apparent by reference to the following description and accompanying drawings wherein.

DETAILED DESCRIPTION OF THE PREFERRED EMBODIMENTS

A preferred embodiment of the invention is described below. This embodiment is merely exemplary. Those skilled in the art will appreciate that changes can be made to the disclosed embodiment without departing from the spirit and scope of the invention.

Figure 1:
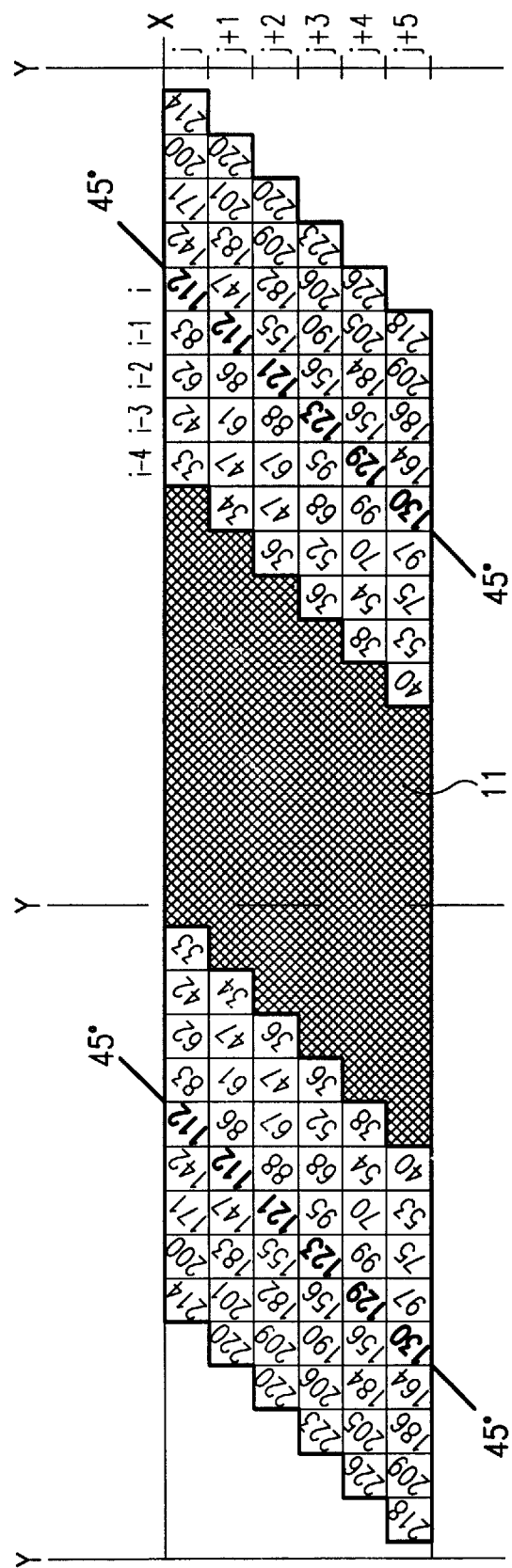
FIG. 1 is a schematic diagram showing a scale-up image of a slanting line segment for detecting the occurrence of missing lines using the method of the present invention.
Figure 3:
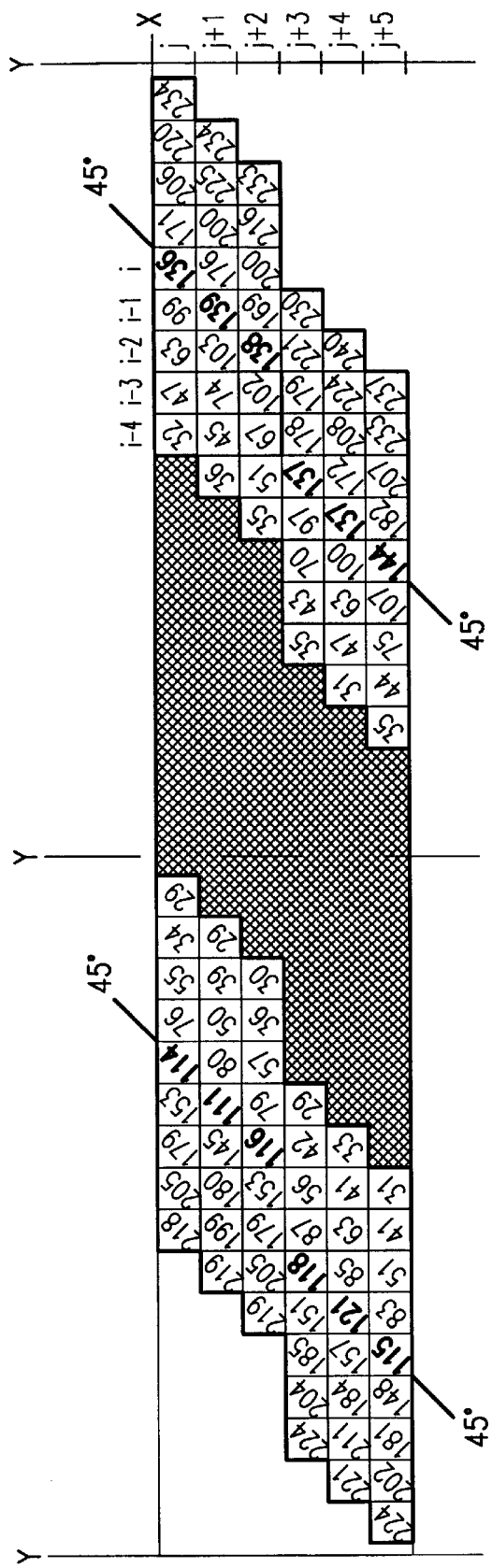
FIG. 3 is a schematic diagram showing a scale-up image of a slanting line segment that has two missing lines.

For the present invention, a slanting line segment of 45 degrees is used because it can best reflect the occurrence of missing lines. Nevertheless, this shall not be viewed as a restriction. An inclination other than 45 degrees can be used too. As shown in FIG. 1, after scaling up the slanting line segment to a proper proportion, the pixels on the edges of both sides of the slanting line segment will be like regular staircase with close gray levels. The middle portion 11 of the slanting line segment is black. The gray levels of the pixels gets lighter and lighter when proceeding to both sides of the slanting line segment. This can be seen from the gray levels indicated by numbers on each pixel. For a normal image, the gray level distributions of the pixels on both sides will be symmetric with respect to the middle portion 11 as illustrated in FIG. 1. When any missing line occurs, gray levels of the pixels on the edges will have visible changes such that the pattern of the staircase will become irregular as illustrated in FIG. 3.

In contrast to eye inspection, the present invention uses gray levels for determining the occurrence of missing lines instead of the pattern of the staircase. For instance, an 8-bit gray-level image will have 256 gray levels starting from zero (black) to 255 (white). The median value of 256 is 128. The gray levels of 0~128 and 129~255 will have more visible contrast, so the invention chooses the median value of the predetermined highest gray levels (256) as a referential value. We will pick a pixel having gray level closest to 128 as the starting point.

The present invention uses 128±δ for comparison, where δ is the fault tolerance value. The invention also predetermines an allowable number of missing lines for the scanner under testing. The allowable number of missing lines for a scanner of higher resolution will be very few. A normal image after being scaled up shall be like the figure as shown in FIG. 1. The gray levels of the pixels in the middle of each row are all black. The gray levels of the pixels on both sides are in a symmetric pattern. If the fault tolerance value is 20, the standard value for comparison is (128±20). For the convenience of explanation, coordinates may be used to allocate the locations of these pixels. The coordinates consist of X axis and Y axis. The index i represents the ith pixel on the X axis while the index j the jth pixel on the Y axis.

To find the pixel closest to the median value of 256, let j be 1 and search each pixel on the 1st row to find the pixel with gray-level value closest to (128±20). Referring to FIG. 1, the pixel with gray-level 112 on the 1st row has gray levels most close to the median value 128. So, the coordinates of that pixel 112 on $(X_i,Y_j)$ will be set as the starting position for comparison where i=1 and j=1.

After that, the gray levels of pixels on j and j+1 row where j=1 are compared. First, the gray levels of the pixels located on $(X_i,Y_j)$ and $(X_{i-1},Y_{j+1})$ are compared. If the gray-level difference between these two pixels is smaller than the fault tolerance value 20, there is no missing line. The comparison may be proceeded to the next two rows. That is, compare the pixels on $Y_{j+1}$ and $Y_{j+2}$ rows are compared.

As shown in FIG. 1, the gray levels of the pixel on $(X_{i-1},Y_{j+1})$ are also equal to 112. This means that there is no missing line between these two rows. Therefore, the index j is increased by one and index i is decreased by one to continue the comparison of the next two rows. According to the sequence, the pixel pairs of <121, 123>, <123, 129>, and <129,130>are compared. Since their gray levels are all within the allowable range, therefore it may be determined that there is no missing line occurring in the image as illustrated in FIG. 1.

If gray levels of the pixels on $(X_i,Y_j)$ and $(X_{i-1},Y_{j+1})$ have a difference larger than the fault tolerance value, this indicates that there are missing lines. To determine the total number of missing lines, we have to do further detection by comparing the gray levels of pixels on $(X_i,Y_j)$, $(X_{i-1},Y_{j+1})$ and $(X_{i-2},Y_{j+1})$. If the result complies with a predetermined condition, that is, if the gray levels of the pixel on $(X_i,Y_j)$ are smaller than the gray level of the pixel on $(X_{i-1},Y_{j+1})$ and larger or equal to the gray level of the pixel on $(X_{i-2},Y_{j+1})$, then we can determine there must be one missing line. On the other hand, if the result does not comply with the predetermined condition, we have to continue comparing the gray levels of the pixels on $(X_i,Y_j)$, $(X_{1-2},Y_{j+1})$ and $(X_{i-3}, Y_{j+1})$. The same procedure will repeat until the comparison result corresponds to the predetermined condition.

The number of missing lines will be counted during the each comparison. Each occurrence of the missing line will be marked. The comparison is proceeded row by row. Each row repeats the same comparison procedure until the entire image has been checked. Finally, the total number of missing lines is output and the marked area of the missing lines is displayed on the screen. It is known that there is no need to compare color lines for the missing line test because the occurrence of missing lines has nothing to do with colors. For this reason, gray levels are enough for this test.

Figure 2:
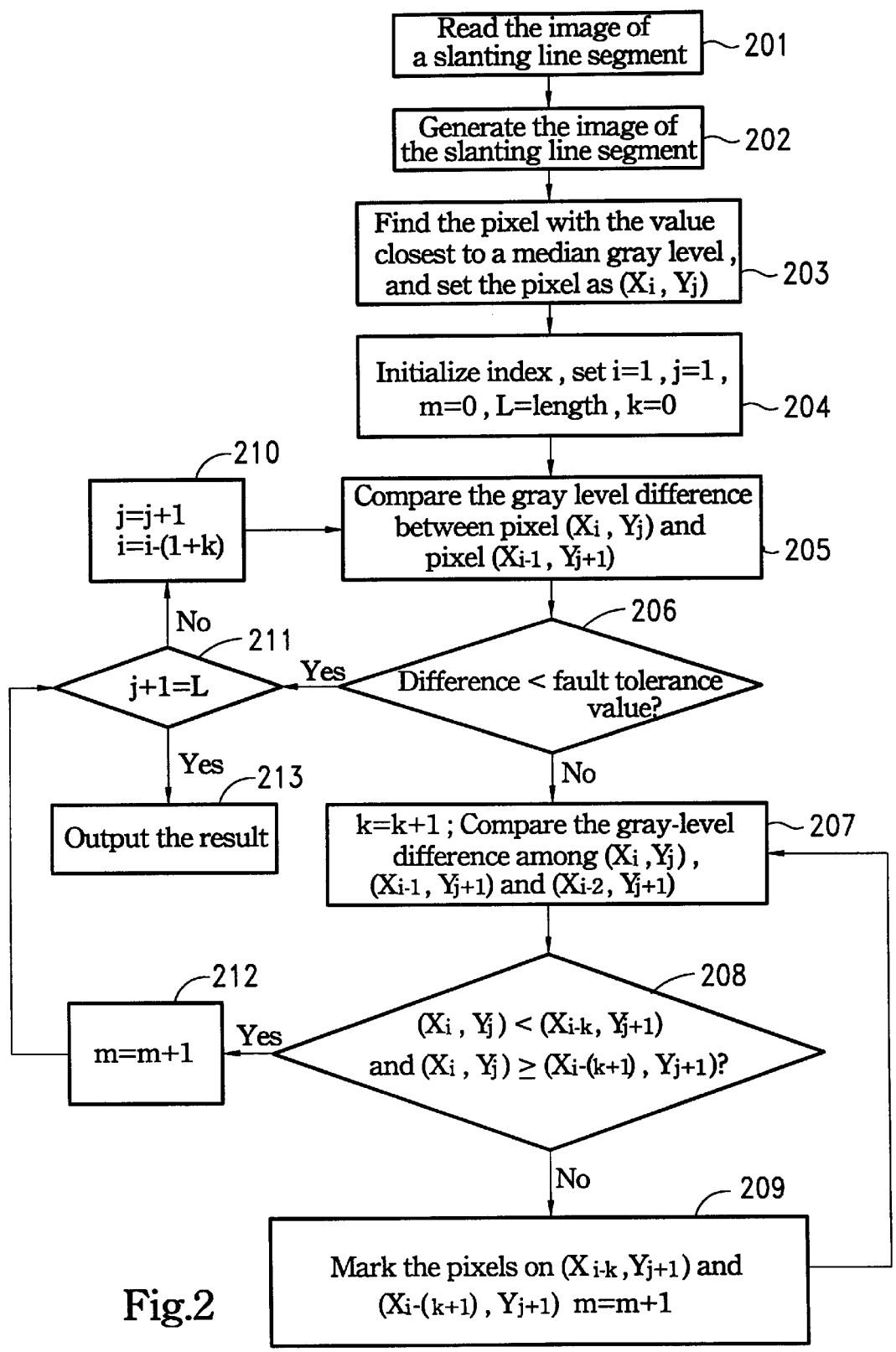
FIG. 2 is a flow chart showing the method of the present invention.

Referring to FIG. 2 for the flow chart showing the detection method according to the invention, the inventive method is implemented in a computer program. The computer program is associated with a user interface where the users can set a fault tolerance value and allowable number of missing lines according to the model and expected quality of the scanner under testing. After getting the predetermined fault tolerance value and allowable number of missing lines, the computer program will automatically execute a series of detection as illustrated in FIG. 2.

According to Step 201, the scanner will first read the slanting line segment on the test chart. As mentioned above, a slanting line segment of 45 degrees will have the best result. According to Step 202, the scanner will generate the image of the slanting line segment. In Step 203, after obtaining the image, the pixel with the gray levels closest to the median value of the predetermined highest gray levels is found using a conventional search algorithm. In Step 204, indices are initialized, whereby, let i=1, j=1, and $(X_i,Y_j)$ denote that pixel found in Step 203, L=the length of the slanting line segment in pixels, m=0 (m works as a counter to count the total number of missing lines.), and k=0 (k is the shift index). In Step 205, the gray-level difference between the pixels on $(X_i,Y_j)$ and $(X_{i-1},Y_{j+1})$ are calculated. According to Step 206; a check is made as to whether the gray-level difference calculated in Step 205 is smaller than the predetermined fault tolerance value. If yes, a determination that there is no missing line on j and j+1 rows is made. The method then proceeds to Step 211 to check if j+1 row is the last row. If yes, movement is made to step 213. Otherwise, movement is made to Step 210. In Step 210, the index j is incremented by one and decrement i by k+1 and then movement is made to Step 205 for next loop of comparison. The loop continues until j+1=L.

On the other hand, at Step 206, if the gray-level difference between the pixels on $(X_i,Y_j)$ and $(X_{i-1},Y_{j+1})$ is larger than the predetermined fault tolerance value, then movement is made to Step 207. This indicates that there is at least one missing line. So, increase k by 1 and compare the two adjacent pixels, $(X_{i-k},Y_{j+1})$, $(X_{i-(k+1)},Y_{j+1})$ to determine the total number of missing lines on j+1 row. In Step 208, the gray level of the pixel on $(X_i,Y_j)$ is checked to see if it is smaller than that of pixel on $(X_{i-k},Y_{j+1})$, and larger or equal to that of pixel on $(X_{i-(k+1)},Y_{j+1})$. If yes, movement is made to Step 212 to increase m by 1. If not, movement is made to step 209 to mark the pixels on $(X_{i-k}, Y_{j+1})$ and $(X_{i-(k+1)}, Y_{j+1})$ and increment m by one because there is at least one missing line. Then, movement is made to Step 207 again. The steps from 207, 208, to 209 form a loop to keep increasing k by one to left shift the pixels for comparison. The counter m at Step 209 can then count the number of missing lines on the same row.

On the other hand, the steps from 208, 211, 206, to 207 form another loop for checking the total number of missing lines for each row when at most one missing line occurs on a row. According to Step 213, since the comparison is complete, to show the total number of missing lines, the area is marked where the missing lines occurred. If the total number of missing lines exceeds the predetermined allowable number of missing lines, a message of "not go" will be shown on the screen. However, if the total number of missing lines is less than the allowable number, a message of "go" will be shown on the screen.

To illustrate the detection method more clearly, the inventive method is applied to FIG. 3 for an example. As shown in FIG. 3, first read and generate the image of the slanting line segment of 45 degrees (Step 201 and 202). Then find the pixel that has the gray levels closest to the median value of the predetermined highest gray levels on the first row (Step 203). Accordingly, we will find the pixel with gray level of 136 on the first row. Then, initialize all the initial values for indices i, j, k, and m (Step 204). So, let i point to the pixel with gray level of 136 on X axis. Set the fault tolerance value to 20 and m to zero. Then, compare the gray levels of the pixels on $(X_i, Y_j)$ and $(X_{i-1}, Y_{j+1})$, i.e. 136 and 139 (Step 205). Since the difference is within the fault tolerance value (i.e. 20), so increase index j by 1 and decrease index i by k+1 (Step 210), then execute step 205.

The next step is to compare the pixels having gray levels of 139 and 138 and check whether their difference is smaller than the fault tolerance value (Step 206). Since the difference is still smaller than the fault tolerance value, and the current row is not the last row (Step 211), therefore increase index j by one and decrease index i by k+1 (Step 210). Repeat Step 205 to compare the pixel having gray levels of 138 and 179. Since their difference is larger than the fault tolerance value, so execute Step 207. Increase k by one and compare the pixels having gray levels of 138, 178 and 179. Then, go to Step 208. Since 138 are smaller than 178 and 179, so execute Step 209. Mark the pixels having gray levels of 178, 179, and increase m by one.

Then, go to Step 207 again. Compare the pixels having gray levels of 138, 178 and 137. Since 138 is smaller that 178, and larger than 137, so go to Step 212 to increase m by one again. Then, execute Step 211 to check whether the entire slanting line segment has been checked. Since it is not finished yet, so go to Step 210 to increase index j by one and decrease index i by 1+k, and continue the comparison on the next row. Then go to Step 205, to form a comparison loop. The same procedure repeats until the entire slanting line segment has been checked. Then, output the comparison result (Step 213). The result is m=2. It means that there are two missing lines. The areas where the missing lines occured will also be marked and displayed on the screen. If the user sets the allowable number of missing lines for the scanner is 2, then the scanner is qualified. If the user sets the allowable number of missing lines is 1, then the scanner is unqualified.

The explanation for FIG. 1 and FIG. 3 is only for the purpose of explanation. If the coordinates are not expressed in the same way, or the slanting line segment has different slope or direction, or the order of the comparison is from left to right or top to bottom, the inventive method also applies. For example, the comparison of gray levels on the pixels can be done on either the right side or the left side with respect to the center portion of the entire slanting line segment because both sides are symmetric. In that case, we only need to change the comparison condition on step 208 so that the "smaller" (<) sign will be changed to "larger" (>) sign and "larger and equal to ($\geq$)" sign to "smaller or equal to" ($\leq$) sign.

In summary, the present invention is an automatic inspection method that can be used to test the image quality of any scanner. The settings of the fault tolerance value can be set according to the desired quality of the scanner. The inventive method can replace eye inspection, reduce human errors, and increase efficiency. Moreover, the missing lines will be marked and displayed on the screen for convenience.

It should be understood that various alternatives to the structures described herein might be employed in practicing the present invention. It is intended that the following claims define the invention and that the structure within the scope of these claims and their equivalents be covered thereby.

What is claimed is:

1. A method for detecting missing lines occurred in a scanned image generated by an optical scanner according to a standard deviation value, a slanting line segment is used to reflect the occurrence of missing lines, comprises the steps of:

a. initializing a first index for X axis, a second index for Y axis, a shift index and a counter, and said first index denoted as i, said second index as j, said shift index as k;

b. predetermining an error tolerance value;

c. setting a starting pixel $(X_i, Y_j)$ of said image for gray-level comparison, said starting pixel having gray levels closest to a median value of predetermined highest gray levels;

d. comparing the gray levels of said starting pixel $(X_i, Y_j)$ and pixel on $(X_{i-1}, Y_{j+1})$, and then outputting a first comparison result;

e. when said first comparison result is smaller than said predetermined error tolerance value, shifting said index i by k+1 and increasing said index j by one, and then executing said step (d);

f. when said first comparison result is larger than said predetermined error tolerance, comparing the gray levels of the pixels on $(X_i, Y_j)$, $(X_{i-k}, Y_{j+1})$ and $(X_{i(k+1)}, Y_{j+1})$ and outputting a second comparison result;

g. determining if said second comparison result is correspondent to a predetermined comparison condition;

h. increasing said counter by one, and executing said step (d) when said second comparison result is correspondent to said predetermined comparison condition,;

i. marking pixels on $(X_{i-k}, Y_{j+1})$ and $(X_{i(k+1)}, Y_{j+1})$, increasing said counter by one, and executing said step (f) when said second comparison result is not correspondent to said predetermined comparison condition; and j. when said j plus one equals to a length of said slanting line segment, outputting a detection result.

2. The method as claimed in claim 1, further comprising the step of:

k. reading said slanting line segment of 45 degrees.

3. The method as claimed in claim 1, wherein said error tolerance value depends on a model of said optical scanner.

4. The method as claimed in claim 1, wherein said step (a) sets said index i as one, said index j as one, said shift index k as zero, and said counter as zero.

5. The method as claimed in claim 1, wherein said step (a) further comprising the step of:

l. setting the length of said slanting line segment.

6. The method as claimed in claim 1, wherein said predetermined comparison condition of said step (g) is when the gray levels of said pixel on $(X_i,Y_j)$ is less than the gray levels of said pixel on $(X_{i-k},Y_{j+1})$, and larger than or equal to the gray levels of pixel on $(X_{i-(k+1)},Y_{j+1})$.

7. The method as claimed in claim 1, wherein said step (j) comprises the steps of:

m. predetermining an allowable number of missing lines;

n. determining said optical scanner as qualified, when the value of said counter is less than or equal to said allowable number of missing lines; and o. determining said optical scanner as unqualified, when the value of said counter is larger than said allowable number of missing lines.

8. The method as claimed in claim 1, wherein predetermined comparison condition of said step (g) is that when the gray level of the pixel on $(X_i,Y_j)$ is larger than the gray level of the pixel on $(X_{i+k},Y_{j+1})$, and smaller or equal to the gray level of pixel on $(X_{i+(k+1)},Y_{j+1})$.

9. A method for detecting missing lines occurred in a scanned image generated by an optical scanner according to a standard deviation value, a slanting line segment is used to reflect the occurrence of missing lines, comprises the steps of:

a. reading an image of said slanting line;

b. predetermining an error tolerance value;

c. setting a starting pixel $(X_i,Y_j)$ of said image for gray-level comparison, said starting pixel having gray levels closest to a median value of a predetermined highest gray levels;

d. comparing the gray levels of said starting pixel $(X_i,Y_j)$ and a pixel on $(X_{i-1},Y_{j+1})$, and then outputting a first comparison result, said i representing an index on X axis and said j representing an index on Y axis;

e. shifting said index i by k+1 and increasing said index j by one, where k is a shift index, and then executing said step (d) when said first comparison result is smaller than said predetermined error tolerance value;

f. comparing the gray levels of the pixels on $(X_i,Y_j)$, $(X_{i-k},Y_{j+1})$ and $(X_{i-(k+1)},Y_{j+1})$ and outputting second comparison result when said first comparison result is larger than a predetermined error tolerance;

g. determining if said second comparison result is correspondent to a predetermined comparison condition;

h. increasing a counter by one, and executing said step (d) when said second comparison result is correspondent to said predetermined comparison condition;

i. marking pixels on $(X_{i-k},Y_{j+k})$ and $(X_{i-(k+1)},Y_{j+1})$, increasing said counter by one, and executing said step (f) when said second comparison result is not correspondent to said predetermined comparison condition; and j. outputting a detection result when said j plus one equals to the length of said slanting line segment.

10. The method as claimed in claim 9, wherein said step (a) reads said slanting line segment of 45 degrees.

11. The method as claimed in claim 9, wherein said error tolerance value depends on a model of said optical scanner.

12. The method as claimed in claim 9, further comprising:

k. setting said index i as one, said index j as one, said shift index k as zero, and said counter as zero.

13. The method as claimed in claim 9, wherein said predetermined comparison condition of said step (g) is when the gray levels of said pixel on $(X_i,Y_j)$ is less than the gray levels of said pixel on $(X_{i-k},Y_{j+1})$, and larger than or equal to the gray level of pixel on $(X_{i-(k+1)},Y_{j+1})$.

14. The method as claimed in claim 9, wherein said step (j) comprises the steps of:

l. predetermining an allowable number of missing lines;

m. determining said optical scanner as qualified when the value of said counter is less than or equal to said allowable number of missing lines; and n. determining said optical scanner as unqualified when the value of said counter is larger than said allowable number of missing lines.

15. The method as claimed in claim 9, wherein said predetermined comparison condition of said step (g) is that when the gray level of the pixel on $(X_i,Y_j)$ is larger than the gray level of the pixel on $(X_{i+k},Y_{j+1})$, and smaller or equal to the gray level of pixel on $(X_{i+(k+1)},Y_{j+1})$.

* * * * *